United States Patent [19]

Andersson

[11] Patent Number: 5,419,295
[45] Date of Patent: May 30, 1995

[54] METHOD FOR CONTROLLING THE TRIGGER SEQUENCE IN A FLYWHEEL MAGNETO SYSTEM

[75] Inventor: Martin Andersson, Caro, Mich.

[73] Assignee: Sem AB, Amal, Sweden

[21] Appl. No.: 129,132

[22] PCT Filed: Mar. 27, 1992

[86] PCT No.: PCT/SE92/00195
§ 371 Date: Dec. 10, 1993
§ 102(e) Date: Dec. 10, 1993

[87] PCT Pub. No.: WO92/18768
PCT Pub. Date: Oct. 29, 1992

[30] Foreign Application Priority Data

Apr. 12, 1991 [SE] Sweden ............................ 9101101

[51] Int. Cl.$^6$ ........................... F02P 5/145; F02P 3/08
[52] U.S. Cl. ..................................... 123/418; 315/218
[58] Field of Search ................ 123/418, 602, 149 C; 315/218

[56] References Cited

U.S. PATENT DOCUMENTS 3,722,488  3/1973  Swift et al. ........................ 123/149 D
4,335,692  6/1982  Miura ................................. 123/418
4,452,199  6/1984  Andreasson ........................ 123/602
4,596,226  6/1986  Kondo et al. ....................... 123/602

FOREIGN PATENT DOCUMENTS 457373  12/1988  Sweden .

Primary Examiner—Andrew M. Dolinar
Attorney, Agent, or Firm—Collard & Roe

[57] ABSTRACT

A method for controlling the trigger sequence in a flywheel magneto system including a magnet system for inducing a trigger pulse for a gate trigger current switch. When the trigger pulse is below a preset level N, the ignition system is triggered based on a voltage difference in the trigger pulse following the trigger pulse peak. As the rotational speed and amplitude of the trigger pulse increase, the triggering is advanced. When the trigger pulse exceeds the preset level N, the ignition system is triggered when the trigger pulse exceeds N. As the rotational speed and amplitude of the trigger pulse increases, the triggering is further advanced. A voltage threshold component is connected in series with the gate trigger current switch to avoid triggering interference.

2 Claims, 2 Drawing Sheets

Point A        Point B

METHOD FOR CONTROLLING THE TRIGGER SEQUENCE IN A FLYWHEEL MAGNETO SYSTEM

BACKGROUND OF THE INVENTION

1. Field of the Invention

The present invention relates to a method for controlling the trigger sequence in a flywheel magneto system, which system includes a magnet system for inducing a trigger pulse for a gate trigger current switch.

2. Prior art

Previously disclosed within the area of ignition circuit design is the arrangement in the primary ignition coil circuit of magneto ignition systems containing an ignition transformer of a gate trigger current switch, for example a thyristor or a transistor. These components conduct at a specific ignition time, resulting in the induction of an ignition voltage in the secondary winding of the coil. A control circuit of this kind, possibly containing a special trigger coil, is connected between the generator circuit and the control input to the gate trigger current switch. Such systems are previously disclosed, for example, through SE-B-357 032, SE-B-455 216, and SE-B-457 373. These previously disclosed systems are complicated and contain sensing devices to control the release of the trigger at an appropriate ignition time.

A flywheel magneto system of the kind mentioned above, in which the method in accordance with the invention can be applied, comprises, for example, a flywheel with a magnet unit installed in the wheel, in which two or more magnetic poles lie on an outer or inner periphery. Arranged directly adjacent to that periphery is a low-retentivity unit consisting of one or more essentially radially oriented legs. Coils are then arranged around one or more of these legs for the purpose of receiving energy from the passing magnetic poles. One common method of executing such a unit is to install all the coils belonging to the ignition system and the other electrical components in such a way that only a single core leg carries the necessary coils. Because capacitor ignition systems are concerned specifically, it is customary to utilize the most energy-rich partial wave in the induced voltage for charging the ignition capacitor. The following partial wave is used in order to initiate the ignition sequence. This permits simple and inexpensive solutions, which make effective use of the available energy. Nevertheless, the partial wave used to start the ignition sequence, "triggering", is too narrow to provide an acceptable advance of the trigger point as the speed of rotation increases, which is desirable. The form of the pulse is also influenced by the delay caused by charging of the ignition capacitor. One method of avoiding this problem is shown in the aforementioned SE-B-457 173. This procedure is less suitable, however, if the trigger-releasing coil is arranged around a core leg which is situated ahead of another core leg past which a magnetic pole moves. The reason for this is that the partial wave used in this case for a coil position of this kind is too indeterminate to produce an exact trigger point.

Another method is to utilize the last partial pulse for capacitor charging and a pulse preceding it, the middle pulse, for triggering. This gives lower energy for charging the capacitor, although in those cases in which this is acceptable, it does not produce the same disadvantages as the system described above, but rather a desired successive advance of the ignition time over the range from start-up to high speed. Unfortunately, this displacement of the ignition point reduces in proportion to the increasing diameter of the orbital path on which the magnetic poles are arranged, if the dimensions of the magnetic pole are essentially retained. The invention described below compensates for this effect.

The nature of the problems associated with the systems referred to above is that triggering at low speeds should occur at a different point on the curve than at high speeds. According to SE-B-457 286, for example, the problem is solved by connecting a computer which controls the triggering and ignition sequences. However, this previously disclosed method requires complicated and expensive components.

SUMMARY OF THE INVENTION

The present invention relates to a simple and inexpensive method for controlling the triggering sequence in flywheel magneto systems, whereby, as the speed of rotation increases, a successive displacement of the trigger point occurs, which involves an advance of the trigger sequence.

The special characteristic feature of the invention can be appreciated from the following claims.

BRIEF DESCRIPTION OF THE DRAWINGS

One embodiment of an arrangement in accordance with the invention is described below with reference to the drawing.

DESCRIPTION OF A PREFERRED EMBODIMENT

Figure 1:
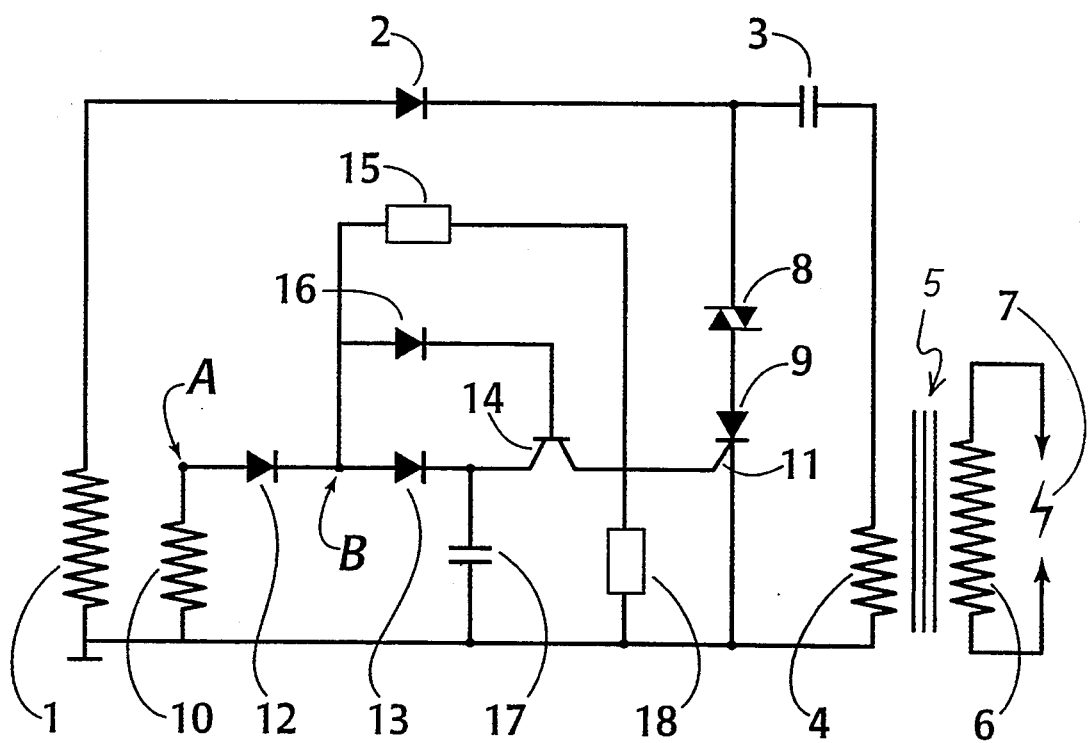
FIG. 1 is a schematic representation of a circuit diagram for the control of the trigger sequence in accordance with the invention.

FIG. 1 shows a circuit diagram for a flywheel magneto system in which a charging winding 1 is so arranged as to interact through induction with a flywheel (not shown here) incorporating permanent magnets. The charging winding is connected in series to a rectifier, a diode 2, and a charging capacitor 3 and the primary winding 4 of an ignition transformer 5. The secondary winding 6 of the ignition transformer is connected to the spark gap of an ignition plug 7. Connected in series between the diode 2 and the capacitor 3 is an arrangement for determining the voltage level at which current is allowed to pass, for example a diac 8, and a gate trigger current switch, for example a thyristor 9, where the capacitor 3, the diac 8, the thyristor 9 and the primary winding 4 form a series circuit. A trigger winding 10 is also arranged in inductive connection with the flywheel. A rectifier diode 12, a further rectifier diode 13 and the emitter input terminal of a PNP transistor 14 are connected in series between the connection point A of the trigger winding 10 and the control input terminal 11 of the thyristor 9. A resistor 15 is connected between a connection point B in the connection between the two rectifier diodes 12 and 13. A Zener diode 16 is also connected between the connection point B and the base of the transistor 14. A trigger capacitor 17 is connected between the emitter of the transistor 14 and earth, and a resistor 18 is connected between the control input terminal 11 and earth.

FIG. 2 illustrates the form of the trigger pulse at different speeds of rotation of the flywheel at the different points A and B in accordance with FIG. 1, and the trigger points T at these speeds of rotation.

The Figure is described in more detail below.

The function of the arrangement is as follows. As the flywheel rotates, a charging pulse is induced in the charging winding 1, which pulse is rectified by the diode 2 and charges the charging capacitor 3 in the usual way. Similarly induced is a trigger pulse, which is rectified by the diode 12. The rectified pulse charges the trigger capacitor 17. The voltage across the diode 13 is sensed, and as the voltage falls, indicating that the peak of the voltage has passed, the voltage across the diode 13 rises. When this voltage overcomes the Zener voltage Z in the Zener diode 16, the transistor 14 begins to conduct and in so doing discharges the trigger capacitor 17, whereby the thyristor 9 is triggered into a conducting state. The charging capacitor 3 is discharged in a familiar fashion, causing a surge of current through the primary winding 4 and producing a sufficiently high ignition voltage across the spark gap electrode 7.

Figure 2A:
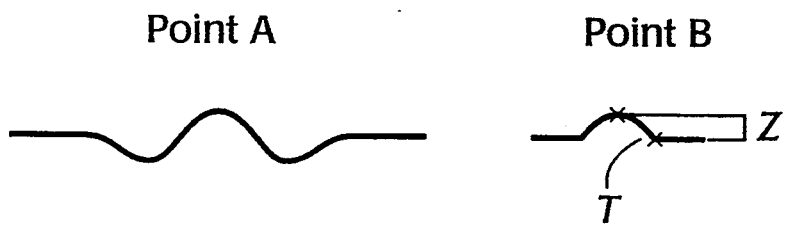
FIG. 2 illustrates the form of the trigger pulse and the trigger point at successively increasing speeds of rotation.

The form of the trigger pulse changes as the speed of rotation increases, i.e. the amplitude increases in line with the pattern shown in FIG. 2a–2d. FIG. 2a shows the appearance of the trigger pulse at the point A and the point B when the speed of rotation is low. The trigger point T occurs when the voltage at the point B has fallen from the highest level of the trigger pulse to a specified level Z. Triggering will start "late" if a relatively large value is selected for Z.

Figure 2B:

FIG. 2b illustrates the situation once the speed of rotation has increased. The amplitude of the trigger pulse has now increased, and the trigger point T has been displaced to the left on the curve, with the result that triggering occurs earlier than shown in FIG. 2a.

The possibility exists in a procedure in accordance with the invention for the peak of the trigger pulse to be at a level twice as high as the difference in level Z required for triggering, or even higher. Further triggering may occur at these levels. Since the capacitor charging of the ignition system has not yet achieved the correct level for reliable ignition, the diac 8, which requires a certain voltage level to be reached in order to permit a current to start to pass, is connected in series with the gate trigger current switch 9. The risk of undesired triggering is eliminated in this way.

Figure 2C:
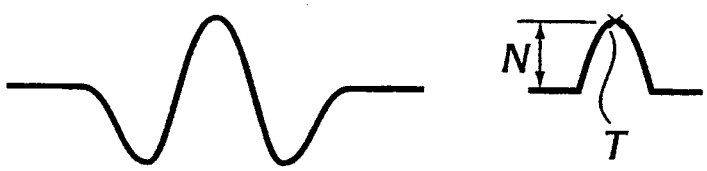
Figure 2D:
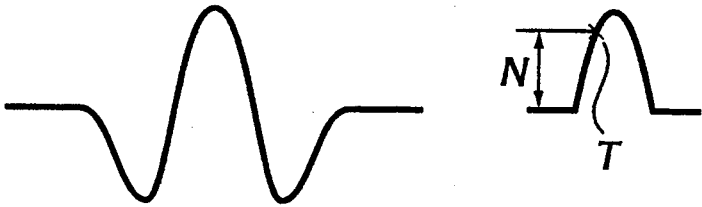

FIGS. 2c and 2d show the trigger pulse at the points A and B after the speed of rotation has increased further, when the amplitude of the pulse reaches the preset voltage level N, which is determined by the size of the resistor 15. Triggering will now take place when this level is reached, i.e. once the trigger point has been displaced further to the left on the curve, with the result that triggering occurs even earlier, which is desirable.

It is clear that the invention is not restricted to the illustrative embodiment described above. The invention is thus not restricted to capacitor ignition systems, or to ignition systems in which the trigger signal is induced in the same core leg as the ignition energy. The thyristor and the transistor can also be replaced by other components, of course. The gate trigger current switch can also be connected directly to the diode, the trigger capacitor and the Zener diode.

The advantage of the system in accordance with the invention is that the method described provides for the total displacement of the ignition point of the desired size.

What is claimed is:

1. A method for controlling the trigger sequence in a flywheel magneto system including a magnet system for inducing a trigger pulse for a gate trigger current switch, the amplitude of the trigger pulse increases as the rotational speed of the flywheel magneto system increases, wherein triggering is based on a preset trigger pulse level N, the method comprising the steps of:
   triggering the ignition system when the trigger pulse is below N based on a voltage difference in the trigger pulse following the trigger pulse peak, as the rotational speed and amplitude of the trigger pulse increase the triggering is advanced; and
   triggering the ignition system with the trigger pulse when the trigger pulse exceeds N, as the rotational speed and amplitude of the trigger pulse increase, the triggering is further advanced.

2. A method for controlling the trigger sequence in a flywheel magneto system including a magnet system for inducing a trigger pulse for a gate trigger current switch, the amplitude of the trigger pulse increases as the rotational speed of the flywheel magneto system increases, wherein triggering is based on a preset trigger pulse level N, the method comprising the steps of:
   connecting a component in a series with the gate trigger current switch which requires a minimum voltage level to activate the gate trigger current switch to avoid triggering interference; and
   triggering the ignition system when the trigger pulse is below N based on a voltage difference in the trigger pulse following the trigger pulse peak, as the rotational speed and amplitude of the trigger pulse increase the triggering is advanced.

* * * * *